United States Patent [19]

Down

[11] 4,143,446
[45] Mar. 13, 1979

[54] ROPE OR CABLE CLAMP DEVICE

[76] Inventor: Dennis L. R. Down, Elwell, Diptford, Totnes, Devon, England

[21] Appl. No.: 800,708

[22] Filed: May 26, 1977

[51] Int. Cl.² ............................................. F16G 11/00
[52] U.S. Cl. ............................. 24/115 R; 24/132 R; 24/132 WL; 24/135 R; 403/312
[58] Field of Search ................ 24/135, 135 A, 135 K, 24/135 L, 136, 115 R, 132 R, 132 WL; 403/312, 281, 284, 313, 311

[56] References Cited

U.S. PATENT DOCUMENTS

| Re. 13,644 | 11/1913 | Robinson | 24/134 R |
|---|---|---|---|
| 307,650 | 11/1884 | Holmes | 403/311 |
| 382,574 | 5/1888 | Westbrook | 24/134 R |
| 779,019 | 1/1905 | Agobian | 24/134 R |
| 799,623 | 9/1905 | Augensen | 403/311 |
| 809,726 | 1/1906 | Nelson | 24/132 R |
| 928,367 | 7/1909 | DeWitt | 24/135 R |
| 1,413,690 | 4/1922 | Slocum | 24/132 R |
| 1,730,197 | 10/1929 | Elsey | 24/135 R |
| 2,348,100 | 5/1944 | Wadsworth | 403/312 |
| 2,499,981 | 3/1950 | Strobel | 24/135 R |
| 2,686,520 | 8/1954 | Jarvis et al. | 24/132 WL |
| 4,001,921 | 1/1977 | Lawlor et al. | 24/132 WL |

FOREIGN PATENT DOCUMENTS

| 77339 | 7/1919 | Austria | 312/132 WL |
|---|---|---|---|
| 451739 | 4/1913 | France | 24/135 R |
| 1338285 | 12/1963 | France | 403/312 |
| 328225 | 4/1955 | Switzerland | 24/135 R |

*Primary Examiner*—Victor N. Sakran
*Attorney, Agent, or Firm*—Watts, Hoffmann, Fisher & Heinke

[57] ABSTRACT

A clamp device for gripping a cable or rope has two essentially semi-cylindrical jaws with longitudinal channels in their flat faces. The jaws can interlock at one end for pivotal movement relative to each other so as to bring the channels into register with each other, defining a cavity in which a rope or cable may be gripped, the jaws being clamped together by for example a screw clamp device engaging the ends of the jaws opposite the interlocking ends. The screw clamp device may serve for the attachment of hooks, eyes or shackles to the clamp device.

4 Claims, 6 Drawing Figures

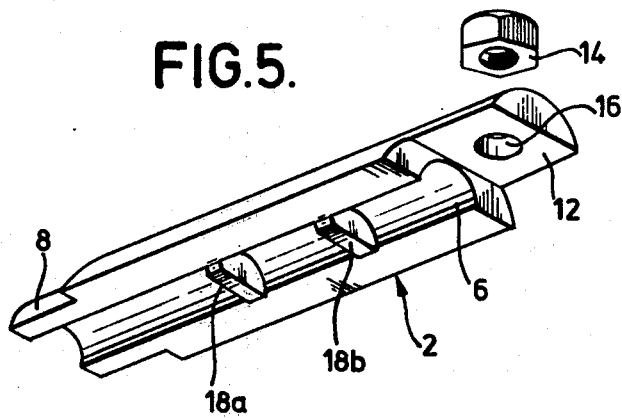
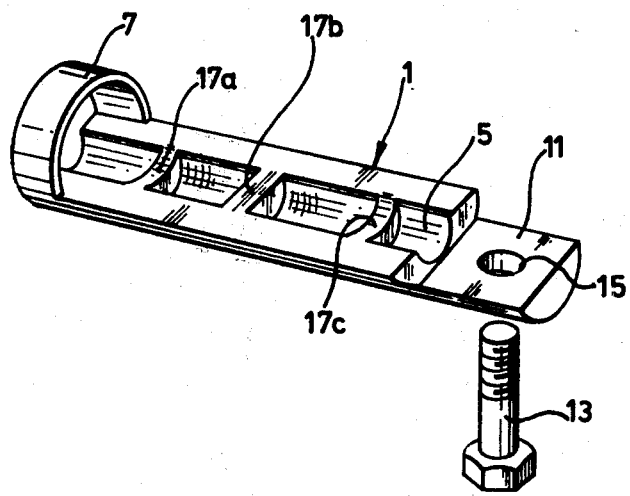
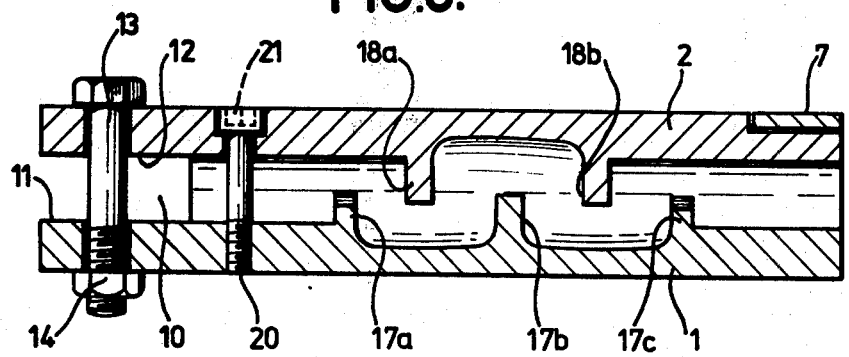

ROPE OR CABLE CLAMP DEVICE

BACKGROUND OF THE INVENTION

This invention relates to a clamp device for gripping cables or ropes.

The traditional method of attaching a hook, eye, shackle or the like to a cable or rope is to make a splice in the cable or rope in which the hook, eye, shackle or the like is embodied. The formation of such splices is in general time consuming and difficult, and usually requires the use of special tools.

Another known method of attaching hooks or eyes to a rope employs screw clamps by means of which a cable or rope is clamped to an adjoining part. Such screw clamps are also time-consuming in use and are in general bulky.

An object of the present invention is to provide a simple but effective clamp device which can make a rapid firm connection to a cable or rope for the attachment of any desired accessory such as a hook, eye, shackle, swivel or the like.

SUMMARY OF THE INVENTION

According to the present invention there is provided a clamp device for gripping a cable or rope comprising two elongate jaws having channels which cooperate to define a cavity adapted to receive a cable or rope to be gripped, the jaws having interlocking portions for connecting the jaws together at one end about which the jaws can swing and releasable clamping means for holding the jaws together in a closed cable-or rope-gripping position.

The dimensions of the channels, which preferably extend longitudinally in the two jaws, are such that a cable or rope of an appropriate gauge when placed in the channels is firmly gripped when the jaws are clamped in their closed position by the clamping means.

The releasable clamping means may comprise a screw device, such as a threaded bolt and cooperating nut, or alternatively may take the form of a clip or spring clamp, engaging the ends of the jaws opposite the said one end.

The jaws are preferably formed with flat recessed surfaces at their ends remote from the interlocking portions, the surfaces being substantially parallel to each other in the closed position of the jaws and spaced apart to define a slot. Where the releasable clamping means comprises a bolt, the shank of the bolt may pass through the flat recessed surface of the jaws, spanning the slot when the jaws are clamped together, and forming with the slot a pin for the attachment of a hook, eye, shackle or other accessory.

The interlocking portions of the jaws may comprise a band or loop attached to or formed at the said one end of one jaw and a cooperating tongue at the said end of the other jaw which engages in the band or loop to hold the jaws together.

The channels in the jaws may have a substantially semi-circular cross section which may conform in diameter to a cable or rope of a predetermined gauge. It would be a simple matter to provide a set of clamp devices according to the invention having channels of different sizes corresponding to different predetermined gauges of rope or cable.

In one embodiment of the invention the channels are provided with circumferentially extending protuberances spaced apart at intervals along the channels to assist in gripping the cable or rope without causing damage thereto. For example, the protuberances may comprise raised ribs of rounded or triangular cross sectional profile.

In another embodiment of the invention the channels in the jaws cooperate to define a cavity of sinuous shape such as to cause a rope or cable to adopt an undulatory shape when the jaws are closed. The channel in each jaw may be bridged by at least one transverse rib, the ribs in the two jaws being disposed in different longitudinal positions to define the undulatory cavity when the jaws are closed.

The clamp device is of simple construction and may be machined easily from steel or light alloy. Preferably the shape of the jaws is such that when closed they present a smooth substantially cylindrical external surface.

The clamp device can be used for gripping fibre or nylon ropes of the type employed in boats, in which case the jaws may be made of brass or some other suitable corrosion resistant alloy. If the jaws of the clamp device are made of suitably hard steel the clamp device can be used for gripping steel wires, cables or hawsers.

BRIEF DESCRIPTION OF THE DRAWINGS

The invention will now be described, by way of example, with reference to the accompanying diagrammatic drawings, in which:

FIG. 5 is an exploded perspective view similar to FIG. 1 illustrating the jaws of a clamp device according to a second embodiment of the invention; and FIG. 6 is a longitudinal section corresponding to FIG. 2, showing a modification of the second embodiment of the invention, with the jaws clamped in their closed rope-gripping position.

DETAILED DESCRIPTION OF THE ILLUSTRATED EMBODIMENTS

Figure 1:
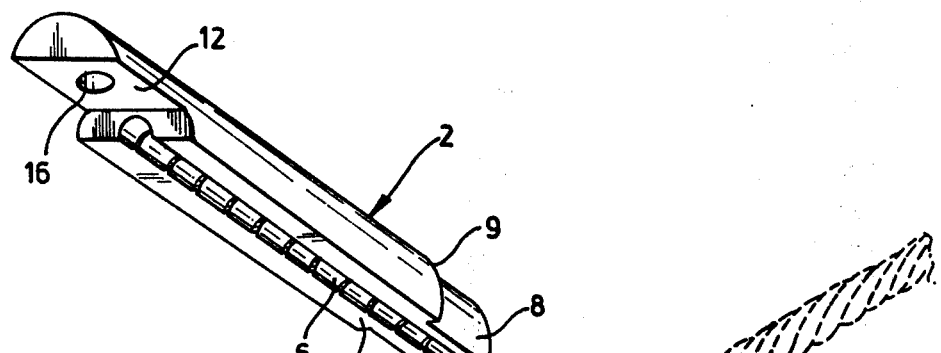
FIG. 1 is an exploded perspective view illustrating the two jaws of a clamp device according to a first embodiment of the invention, shown separated from each other prior to assembly of the clamp device.

The clamp device of the first embodiment illustrated in FIGS. 1 to 4 is designed to receive and grip one end of a rope to make a firm connection thereto. The device consists of two elongate jaws 1, 2 each of which has a part-cylindrical section with a flat face 3, 4 in which a central longitudinally extending channel 5, 6 is formed. The channels 5, 6 have a substantially semicircular cross-section conforming in diameter to the gauge of a rope R to be gripped.

One of the jaws 1, is formed at one end with an integral band or loop 7 of part-circular shape, the external surface of which is an effective continuation of the outer cylindrical surface of the jaw. The band or loop 7 may be formed in one piece with the jaw 1, or alternatively attached thereto by welding. The other jaw, 2, is formed at its corresponding end with a tongue 8 of semi-cylindrical cross sectional profile, the diameter of the part-cylindrical surface portion of the tongue 8 being slightly less than the internal diameter of the band or loop 7. The tongue 8 may be formed by a milling operation on the end of the jaw 2, forming a part-annular shoulder 9 in the jaw 2.

The jaws 1, 2 can be brought together with their flat faces 3, 4 facing each other, and the tongue 8 engaged in the band or loop 7 to interlock the jaws 1, 2 at one end, the clearance between the tongue 8 and the band or loop 7 being sufficient to enable the jaws to swing together or apart by pivotal movement about their interlocked ends. When the jaws 1, 2 are brought together in this way the channels 5, 6 cooperate to define a substantially cylindrical cavity in which a cable or rope R can be received. When the two jaws 1, 2 are clamped together with their flat faces 3, 4 in abutment with each other the rope R is firmly gripped between the jaws, so that the device is firmly anchored to the rope.

The ends of the jaws 1, 2 remote from their interlocking ends, that is, the ends formed with the band or loop 7 and the tongue 8 respectively, are formed with respective flat recessed surfaces 11, 12, parallel to the respective flat faces 3, 4 so that when the two jaws 1, 2 are clamped together in a closed position (FIGS. 2-4) the recessed surfaces 11, 12 are parallel to each other and spaced apart to define a slot 10 in the end of the device opposite the end into which the cable or rope passes.

The jaws 1, 2 are conveniently clamped together by means of a pin or bolt 13 having a threaded end upon which a nut 14 engages, the bolt 13 passing through holes 15, 16 in the recessed surfaces 11, 12 of the respective jaws 1, 2 so that the shank of the bolt spans the slot 10 with its axis generally perpendicular to the surfaces 11, 12.

Figure 2:
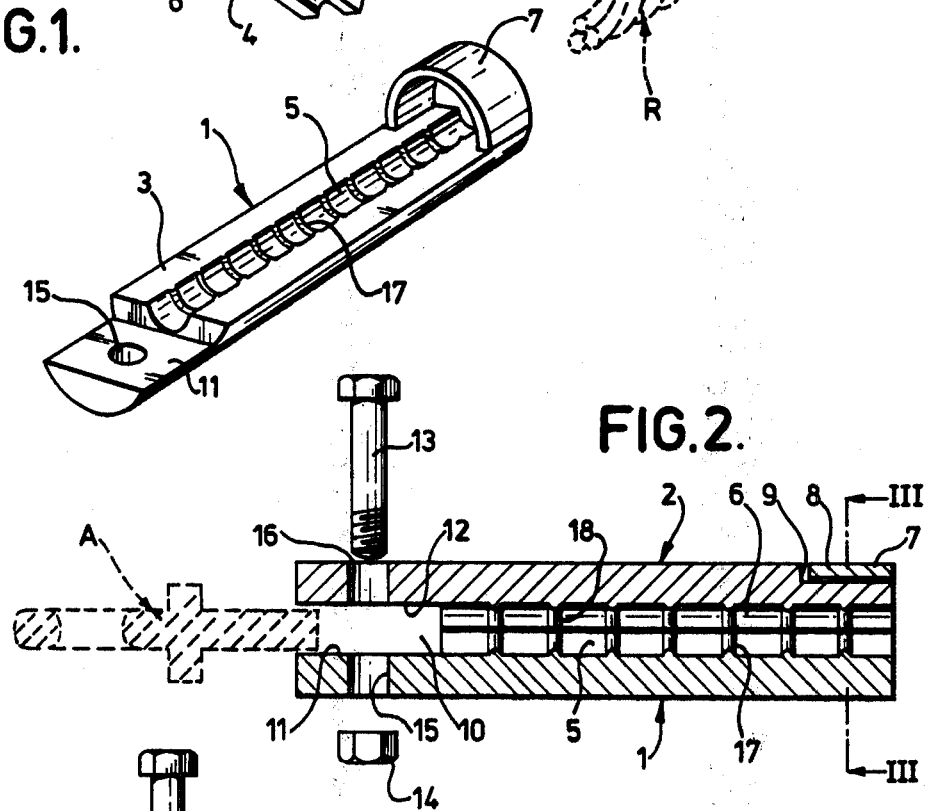
FIG. 2 is a longitudinal section through the clamp device shown in FIG. 1, with the jaws in their closed position gripping a rope.
Figures 3, 4:
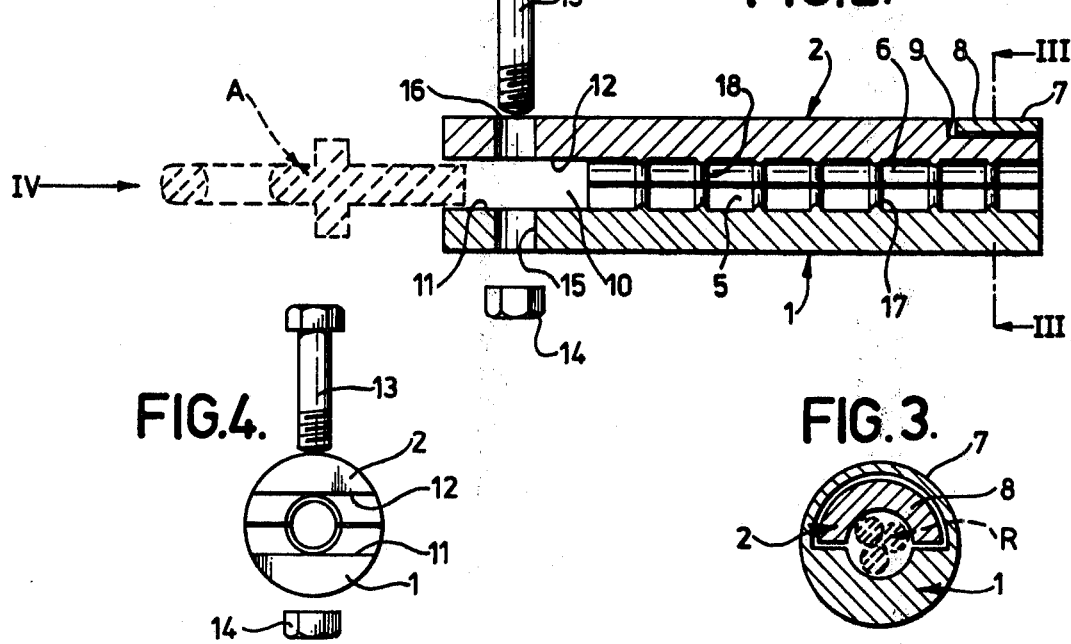
FIG. 3 is a cross section taken on line III—III of FIG. 2.
FIG. 4 is an end view of the device in the direction of arrow IV in FIG. 2.

The shank of the pin or bolt 13, which spans the slot 10 in the assembled and closed clamp device, can be used for the attachment to the device of an accessory A such as a hook, eye, D-shackle, swivel or the like, as shown in broken outline in FIG. 2.

To enhance the gripping effect of the two jaws 1, 2 the channels 5, 6 in the jaws may have circumferentially extending grooves or protuberances formed therein at intervals. In the embodiment illustrated in FIGS. 1 to 4 the semi-cylindrical channels 5, 6 are formed with raised ribs 17, 18 of rounded cross-sectional profile which assist in gripping the rope R when the jaws are closed, without damaging the rope. The ribs 17, 18 are not essential to the gripping function of the clamp device, which arises from the interlocking and clamping of the two jaws 1, 2. The two channels 5, 6 have a diameter such as to exert a squeezing action on the clamped section of rope R, so that when the jaws are clamped together further compression is applied to the rope R, this compression being enhanced in the vicinity of the interlocked tongue 8 and band or loop 7 by the leverage resulting from the distance of the clamping point (bolt 13 and nut 14) from the interlocked ends.

Each accessory A for attachment to the device may be formed with a flat tongue which fits into the slot 10 either as a loose fit for pivotal movement about the bolt 13, or as a tight fit abutting the closed end of the slot 10.

The external surfaces of the two jaws 1, 2 may be formed with flats or recesses to receive the head of the clamping bolt 13 and the nut 14, so as to restrain the bolt 13 from rotation.

FIG. 5 illustrates a second embodiment of the invention in which component parts which are the same as or correspond to those of the first embodiment are designated by the same reference numerals as those employed in FIGS. 1 to 4: these component parts will require no further description or explanation.

In the embodiment of FIG. 5 the respective channels 5 and 6 in the jaws 1 and 2 are basically semi-cylindrical in shape. The channel 5 is bridged by three transverse ribs 17a, 17b, 17c, the central one 17b of which spans the entire cross section of the channel 5, while the two outer ribs 17a, 17c are somewhat shallower in depth than the central rib 17b. The portions of the channel 5 between the central rib 17b and the two ribs 17a, 17c are of increased depth relative to the depth of the remainder of the channel 5.

The channel 6 in the jaw 2 is bridged by two ribs 18a, 18b which span the entire cross section of the channel 6 and which each project beyond the respective flat face 4 of the jaw 2, the positions of the two ribs 18a, 18b being such that upon assembly of the clamp device the ribs 18a, 18b, are disposed mid-way between the ribs 17a, 17b and 17b, 7c, respectively, the two ribs 18a, 18b each projecting a short way into the respective deepened portions of the channel 5 between the central rib 17b and the two ribs 17a, 17c.

The channel 6 in the jaw 2 has increased depth between the two ribs 18a and 18b, substantially the same as the depth of the aforesaid deepened portion of the channel 5 between the central rib 17b and the ribs 17a and 17c.

It will be appreciated that a cavity of sinuous longitudinal profile is defined by the cooperating channels 5 and 6 of the two jaws 1 and 2 so that a rope (not shown) received in this cavity is deformed into an undulatory shape by the ribs 17, 18 when the jaws 1 and 2 are clamped together, thereby ensuring tight gripping of the rope between the jaws when the clamping nut 14 is tightened on the bolt 13.

The holes 15 and 16 in the ends of the jaws 1 and 2 which define the slot 10 may receive a screw-threaded pin or bolt 13 which spans the slot 10 and serves for the connection to the clamp device of a releasable shackle, eye or the like. A nut 14 engages the screw-threaded end of the bolt 13. In the embodiment of FIG. 5, as in that of FIGS. 1 to 4, the bolt 13 and nut 14 clamps the jaws 1 and 2 together.

In the modification illustrated in FIG. 6, the jaws 1 and 2 are initially closed together by means of the bolt 13 and nut 14, and then a screw pin 20 is inserted through a hole in one jaw, 2, and into a corresponding threaded hole in the other jaw 1, adjoining the closed end of the slot 10. The bolt 13 may be removed once the pin 10 has been screwed home. The pin 20 may conveniently have a flush-fitting countersunk head 21, formed, for example, with an Allen key socket, as shown in FIG. 6.

Although in the illustrated embodiments a single channel is shown in each jaw of the clamp device, in practice more than one such channel may be provided. For example, each jaw may be formed with a pair of parallel channels for gripping two portions of a rope or cable so as to form a loop or bight, without the need to form a splice. Alternatively, each jaw may be formed with a single channel of sufficient width to accommodate two portions of a rope or cable side by side. In another alternative each jaw may have a single channel which is doubled upon itself in a U-shaped configuration for the purpose of receiving a U-shaped or hairpin bend in a rope, theeby increasing the total length of rope gripped between the jaws.

I claim:

1. A clamp device for gripping a cable or rope comprising:
   two completely separable elongate jaws having therein longitudinally extending channels of substantially semi-circular cross-section;
   interlocking portions at one end of said jaws for interlocking the jaws at said end for angular movement relative to each other about a transverse axis at said one end, and
   releasable screw clamp means engaging the ends of the jaws opposite the said interlocking portions for holding the jaws together in a closed gripping position in which the channels in the jaws register with each other to define a cavity for receiving a cable or rope to be gripped;
   a plurality of ribs in each jaw extending transversely across the respective channel in the jaw, the ribs in the two jaws being spaced apart longitudinally along the respective channels and being disposed in different respective longitudinal positions so that the cavity defined by the channels when the jaws are closed has a sinuous shape, causing a rope or cable to adopt an undulatory shape when clamped in the cavity with the jaws closed.

2. The clamp device defined in claim 1, wherein the jaws are formed with flat recessed surfaces at their ends remote from the interlocking portions, said recessed surfaces being substantially parallel to each other to define a slot in the closed position of the jaws, and including a bolt passing through aligned holes in the recessed surfaces and spanning said slot for the attachment of accessory devices to the clamp device, said clamping means comprising a screw pin engaging in further aligned holes in said jaws adjacent and spaced from said recessed surfaces, one of said further holes being internally screw-threaded.

3. The clamp device defined in claim 1, wherein the interlocking portions comprise a loop portion attached to said one end of jaw and a cooperating tongue portion at the said one end of the other jaw, said tongue engaging in the loop portion to hold the jaws together at said one end, the respective channels in the jaws extending through the loop and tongue portions for the passage of a rope or cable therethrough.

4. The clamp device defined in claim 2 wherein one rib on one jaw and an adjacent rib on the other jaw have a combined depth which exceeds the width of the said cavity.

* * * * *